United States Patent
Agarwal et al.

(10) Patent No.: US 6,529,485 B1
(45) Date of Patent: Mar. 4, 2003

(54) METHOD FOR GENERATION OF ACCURATE DOPPLER-FREE LOCAL CLOCK IN SATELLITE/WIRELESS NETWORKS

(75) Inventors: Anil K. Agarwal, Gaithersburg, MD (US); Thomas Inukai, Gaithersburg, MD (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 09/331,406

(22) PCT Filed: Oct. 20, 1998

(86) PCT No.: PCT/US98/21636

§ 371 (c)(1), (2), (4) Date: Aug. 26, 1999

(87) PCT Pub. No.: WO99/21294

PCT Pub. Date: Apr. 29, 1999

Related U.S. Application Data

(60) Provisional application No. 60/062,497, filed on Oct. 20, 1997, provisional application No. 60/064,673, filed on Oct. 20, 1997, and provisional application No. 60/062,496, filed on Oct. 20, 1997.

(51) Int. Cl.[7] .............................................. H04B 7/212
(52) U.S. Cl. ...................... 370/324; 370/503; 455/13.2
(58) Field of Search ............................... 455/13.2, 427, 455/502, 503; 370/316, 324, 503, 507

(56) References Cited

U.S. PATENT DOCUMENTS

| | | | | |
|---|---|---|---|---|
| 4,019,138 A | * | 4/1977 | Watanabe et al. | 455/13.2 |
| 4,361,886 A | * | 11/1982 | Gutleber | 455/13.2 |
| 4,872,164 A | | 10/1989 | Rieger | |
| 5,898,902 A | * | 4/1999 | Tuzov | 455/13.2 |

FOREIGN PATENT DOCUMENTS

| | | |
|---|---|---|
| JP | 3-216028 | 9/1991 |
| JP | 4-87426 | 3/1992 |

* cited by examiner

Primary Examiner—Lester G. Kincaid
(74) Attorney, Agent, or Firm—Sughrue Mion, PLLC

(57) ABSTRACT

A method for generating a Doppler-free local clock in a communications network having a master reference terminal (400) and a terminal (200) exchanging reference and management bursts, includes steps for determining a transmit timing correction value responsive to the management burst received by the master reference terminal (400), determining a receive timing correction value responsive to the reference burst received by the terminal (200), and adjusting the frequency of a clock responsive to both the transmit timing correction value and the receive timing correction value to thereby generate the Doppler-free local clock.

18 Claims, 11 Drawing Sheets

METHOD FOR GENERATION OF ACCURATE DOPPLER-FREE LOCAL CLOCK IN SATELLITE/WIRELESS NETWORKS

This application is based on and claims priority from provisional patent applications, Ser. Nos. 60/062,497, 60/064,673 and 60/062,496, which are incorporated herein by reference for all purposes.

BACKGROUND OF THE INVENTION

The present invention relates generally to methods for generating a clock in satellite and/or wireless networks. More specifically, the present invention relates to methods for generating an accurate, Doppler-free local clock in satellite and/or wireless networks.

In a distributed satellite/wireless network based on Time Division Multiple Access (TDMA) technology, terminals need a highly stable local timing source (i.e., clock) to generate TDMA frame timing and to generate terrestrial interface clocks. One option is to require an expensive timing source in every terminal, which is inappropriate for large low-cost networks. A second option, that has been used to date, is to install a highly stable clock at the Reference Terminal (RT) only; traffic terminals (TTs) use an inexpensive voltage controlled oscillator (VCXO) or a direct digital synthesizer (DDS) with a free running, inexpensive oscillator, that is fine-tuned to derive a stable clock. The reference terminal transmits a reference burst once per TDMA frame time. The traffic terminal's receive frame timing is modified based on arrivals of the reference bursts. Periodically, the traffic terminal transmits a management burst to the reference terminal; the reference terminal reports the error in timing to the traffic terminal, which in turn modifies its transmit frame timing appropriately. The control information for tuning the VCXO or DDS is derived from the timing corrections made to the terminal receive timing. Effectively, the VCXO or DDS is tuned so that the derived local clock is phase locked to the received reference burst arrival rate.

The above method results in a traffic terminal clock that is as stable as the reference terminal clock, over any given large time period. Any drift in the local oscillator is automatically removed. However, the traffic terminal clock includes the Doppler frequency caused by the daily movement of the satellite, which is caused due to orbit imperfections. Hence, in any 24-hour period, the derived clock rate will vary by ±D, where D is the maximum change in clock rate caused by Doppler. Several different approaches have been proposed to correct the local clock with respect to a precision clock. For example, U.S. Pat. No. 4,602,375 discloses a procedure for correcting a clock onboard a satellite using drift prediction. In contrast, U.S. Pat. No. 4,639,680 discloses the use of an average of phase error signals in determining an appropriate clock correction value. Both U.S. Pat. Nos. 4,602,375 and 4,639,680 are incorporated herein by reference for all purposes.

A satellite/wireless TDMA system requires an accurate local clock at each traffic terminal to transmit and receive bursts in synchronism with the TDMA frame timing established by a reference terminal. The transmit and receive frame counters are hardware counters that repeatedly count from 0 to N−1 and are clocked by the local clock. N is the length of the TDMA frame expressed in units of the clock cycle time. The transmit frame counter is used to position transmit bursts within a frame; the receive frame counter is used to position an "aperture" around the expected receive time of every burst.

Differences in the actual rates of the clocks used by the reference terminal and the traffic terminal cause the reference burst to arrive slightly earlier or slightly later than the expected arrival time at the traffic terminal. The traffic terminal measures this time difference for every arriving reference burst and adjusts the local receive frame counter to either extend the next frame time or to shorten the next frame time, as appropriate. This correction is referred to as a Receive Timing Correction (RTC). With this procedure, the receive frame timing of the local terminal "tracks" the transmit frame timing of the reference terminal. The rate of these corrections is equal to the difference in frequencies between the local clock and the reference terminal clock; for example, if the frequency difference is n Hz, then the receive timing will be correct, on average, by n units every second.

Another factor that contributes to the frequency difference between the reference terminal and a traffic terminal clocks is the relative satellite motion. As the distance between a terminal and the satellite change, due to imperfections in satellite orbit, the delay between the local terminal and the reference terminal changes. This results in reference bursts arriving earlier or later at the local terminal, which results in corrections to the local receive frame counter. Hence, the rate of change of the receive timing corrections is not just a function of the difference in frequencies between the local clock and the reference terminal clock, but it is also a function of the rate of change of satellite delay (referred to as satellite Doppler).

A similar procedure is used to track the transmit timing of the traffic terminal. The traffic terminal periodically transmits a management burst to the reference station. Differences in the clocks used by the reference terminal and the local terminal cause the management burst to arrive slightly earlier or slightly later than the expected arrival time at the reference terminal. The reference terminal measures this time difference for every arriving management burst and sends the difference value to the traffic terminal. The traffic terminal in turn adjusts the local transmit frame counter to either extend the next frame time or to shorten the next frame time, as appropriate. This correction is referred to as a Transmit Timing Correction (TTC). With this procedure, the transmit frame timing of the traffic terminal "tracks" the receive frame timing of the reference terminal. The rate of these corrections is a function of the difference in frequencies between the local clock and the reference terminal clock and the rate of change of satellite delay. Transmit timing correction can also be accomplished by a traffic monitoring its own management burst, if possible, and measuring the timing error.

Traditionally, RTC has been used as a basis for adjusting the frequency of the local oscillator. The rate of receive corrections has been used as a correction factor that is applied to the local oscillator. The local oscillator is adjusted such that the net amount of corrections made to the receive frame counter is zero over any extended period of time. In simple terms, if the net amount of RTCs is positive, the local oscillator frequency is decremented by an appropriate amount; if it is negative, its frequency is incremented by an appropriate amount. The long term stability of the local clock is the same as that of the reference clock; however, the local clock includes the daily variations of satellite Doppler.

Consider a simple example, where the reference terminal clock frequency is R, the traffic terminal clock frequency is also R, the traffic terminal clock is not corrected based on RTC, and the satellite to traffic terminal distance is decreasing at a constant rate. Receive frames will be shortened in time, causing receive timing to be corrected at a rate of d bits/sec, where d is such that the received bit rate appears to be R+d instead of R due to satellite Doppler. Frame timing transmitted by the local terminal using the clock rate R will similarly be shortened at arrival at the reference terminal due to the Doppler. The reference terminal will send transmit timing corrections to the traffic terminal to delay its transmit timing. The rate of timing corrections as seen at the traffic terminal will be −d. Hence, in steady state, the receive timing correction rate will be d and the transmit timing correction rate will be −d.

Now consider the same example except that the local clock frequency has changed to R−r due to drift in the local oscillator frequency. Assuming no corrections are made to the local clock, the RTC rate will become d+r and the TTC rate will become −d+r.

Thus, if the traditional clock correction algorithm, which is based on RTC rate, is allowed to operate, the local clock rate will change from R−r to R−r+d+r, i.e., R+d, the RTC rate will become 0, and the TTC rate will become −2d. The net effect is that the local clock drift r is removed but the resultant clock includes the Doppler component.

What is needed is a clock generation algorithm (CGA) which advantageously employs measured timing error information to automatically remove both clock drive and satellite Doppler from the local clock of a traffic terminal. Stated another way, what is needed is a CGA which reproduces an accurate clock at the traffic terminal whose long-term stability matches that of the frequency standard residing at the reference terminal and that is free of satellite Doppler. Moreover, what is needed is a clock that advantageously can be used to provide clocks on terrestrial interfaces, i.e., components coupled to the traffic terminal. Furthermore, it would be desirable if the hardware device required to implement the CGA could be a low-cost component, e.g., a voltage controlled oscillator (VCXO) or a direct digital synthesizer (DDS) coupled to a free running oscillator.

SUMMARY OF THE INVENTION

Based on the above and foregoing, it can be appreciated that there presently exists a need in the art for a method for generating an accurate, Doppler-free clock in satellite and/or wireless networks which overcomes the above-described deficiencies. The present invention was motivated by a desire to overcome the drawbacks and shortcomings of the presently available technology, and thereby fulfill this need in the art.

The present invention is a method for producing a Doppler-free local clock Advantageously, this Doppler-free local clock can be used to provide an accurate signal to systems connected to traffic terminals which are not equipped with respective precision clocks.

One object according to the present invention is to provide a method for producing a local clock at each traffic terminal that is free of the frequency offset caused by Doppler due to satellite motion. Advantageously, this Doppler-free local clock can be used to clock out data to terrestrial interfaces without passing satellite Doppler.

Another object according to the present invention is to provide a method for controlling either a low cost VCXO or a low cost DDS with an associated free-running oscillator at traffic terminals to thereby generate a Doppler-free local clock.

Still another object according to the present invention is to provide a method for generating a Doppler-free local clock irrespective of whether the associated network is a single beam (or global beam) TDMA network or a multi-beam TDMA network.

Still another object according to the present invention is to provide a method for generating a Doppler-free local clock employing an adaptive averaging period, which provides rapid responsiveness when the frequency offsets are relatively large and more precise measurements and corrections when frequency offsets are relatively small.

These and other objects, features and advantages according to the present invention are provided by a method for generating a Doppler-free local clock in a communications network including a master reference terminal and a terminal exchanging reference and management bursts. Advantageously, the method includes steps for determining a transmit timing correction value responsive to the management burst received by the master reference terminal, determining a receive timing correction value responsive to the reference burst received by the terminal, and adjusting the frequency of a clock responsive to both the transmit timing correction value and the receive timing correction value to thereby generate the Doppler-free local clock.

These and other objects, features and advantages according to the present invention are provided by a method for generating a Doppler-free local clock in a communications network including a master reference terminal and a terminal exchanging reference and management bursts. Preferably, the method includes steps for initialing the master reference terminal responsive to a first reference burst generated by the master reference terminal, determining a transmit timing correction value responsive to the management burst received by the master reference terminal, determining a receive timing correction value responsive to a second reference burst received by the terminal, and adjusting the frequency of a clock responsive to both the transmit timing correction value and the receive timing correction value to thereby generate the Doppler-free local clock.

These and other objects, features and advantages according to the present invention are provided by a method for generating a Doppler-free local clock in a communications network including a master reference terminal and a terminal exchanging reference and management bursts Preferably the method includes steps for:

(1) initializing the master reference terminal responsive to a first reference burst generated by the master reference terminal, (2) determining a transmit timing correction value responsive to the management burst received by the master reference terminal, (3) determining a receive timing correction value responsive to a second reference burst received by the terminal, and (4) accumulating the transmit timing correction value and the receive timing correction value to thereby generate a total accumulated error value, (5) determining whether a frequency adjustment is required responsive to the total accumulated error value, (6) when the frequency adjustment is not required, repeating the steps (2) and (3), (7) when the frequency adjustment is required, calculating an adjustment value which is applied to the frequency of a clock responsive to the total accumulated error value to thereby generate the Doppler-free local clock.

According to one aspect of the present invention the calculating step uses the formula $$f = (yn - prevyn)/Tc/2 + yn/Ty/2$$

where yn is the total accumulated error, since the last receive acquisition was successfully performed, prevyn is the value of yn when the previous clock correction was made, f is the adjustment value indicative of the required change in reference frequency (Rf) in Hz, Ty is a constant, and Tc is the time since f was last computed.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

As discussed above, when a traditional clock correction algorithm based on RTC rate is allowed to operate, the local clock rate will change from R−r to R−r+d+r, i.e., R+d and, thus, the RTC rate will become 0 while the TTC rate will become −2d. The net effect is that the local clock drift r is removed but the resultant clock includes the Doppler component.

The method for generating a Doppler-free local clock according to the present invention works by changing the local clock not based on the RTC rate but based on the average of the RTC and TTC rates. In the example mentioned immediately above, this average is equal to ((d+r)+(−d+r))/2, i.e., r. Hence, the local clock rate changes from R−r to R, the RTC rate will become d, and the TTC rate will become −d. It will be appreciated that this is the fundamental step that advantageously allows the local clock to be corrected to the reference terminal clock value without including the Doppler component.

The method for generating a Doppler-free algorithm requires a local oscillator feeding a software controllable clock generator. For example, this hardware requirement advantageously can be satisfied by either a voltage controlled oscillator (VCXO) or a direct digital synthesizer (DDS). The output of the VCXO or DDS is the derived local clock, which beneficially can be employed to operate the associated local TDMA frame counters and to generate receive and transmit frame timing.

Figure 1:
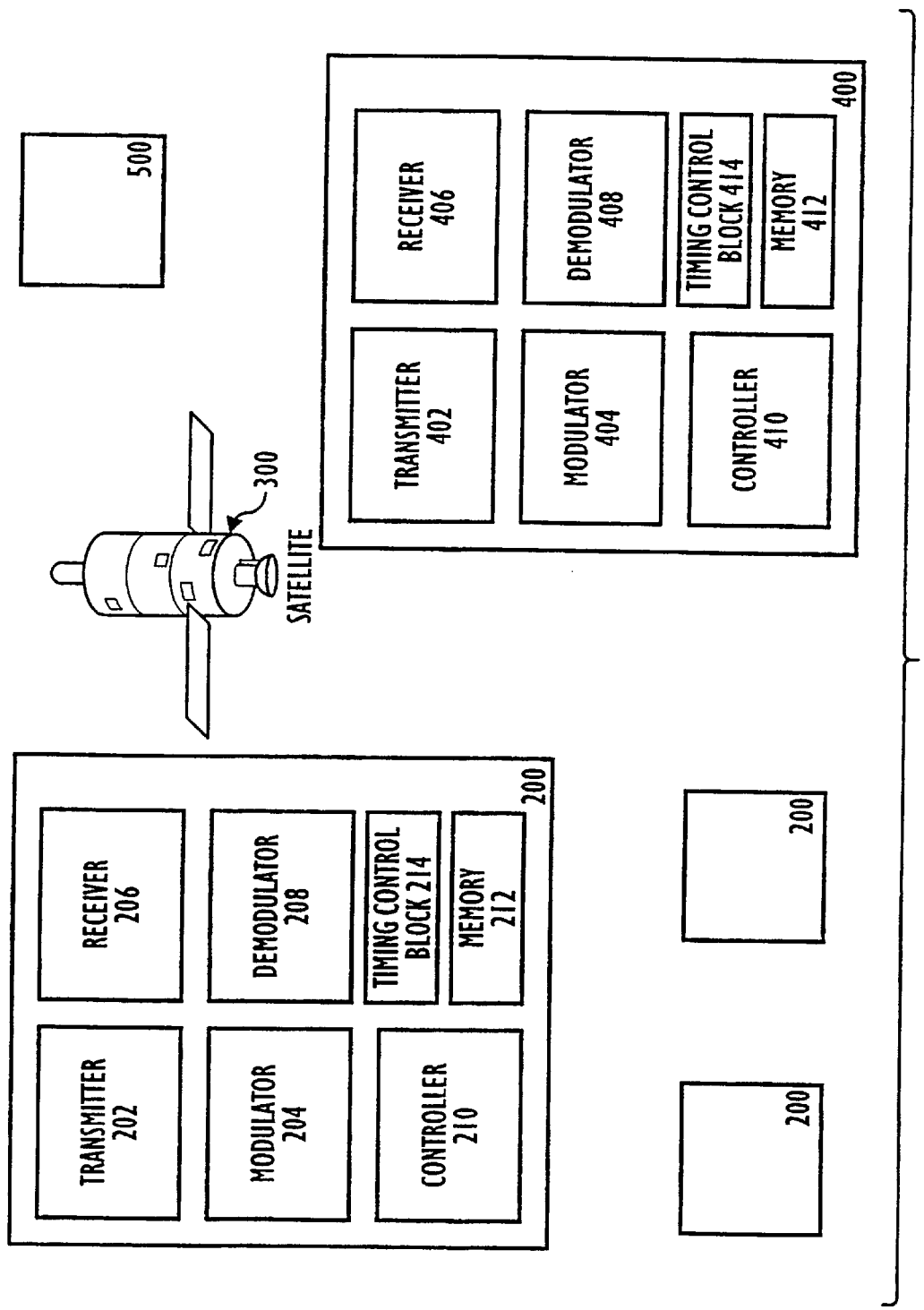
FIG. 1 is a high level block diagram of a satellite network employing the method for generation a Doppler-free local clock according to the present invention.
Figure 2:
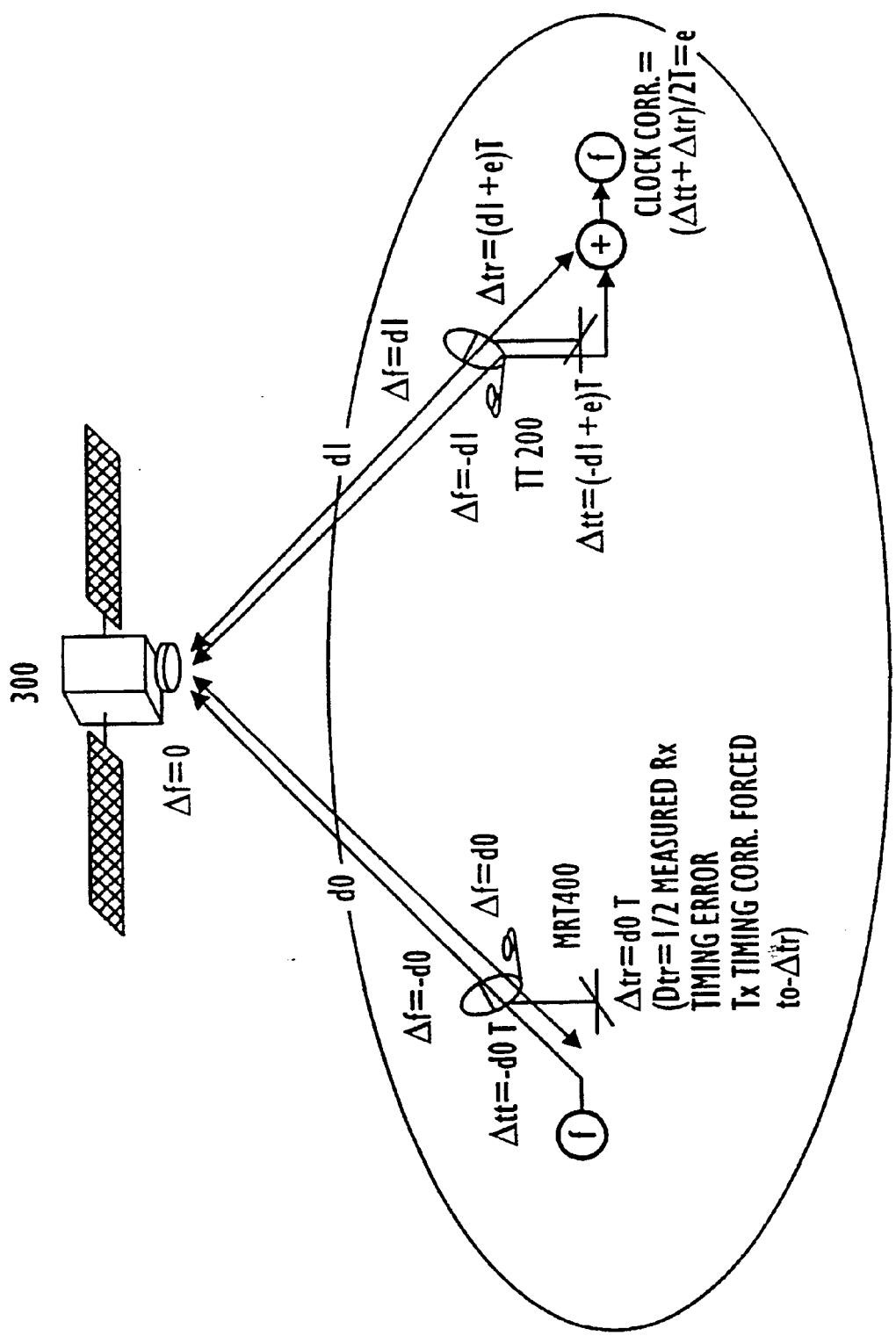
FIG. 2 is a representational diagram of the various clock and offsets associated with global beam operation of the system illustrated in FIG. 1.
Figure 3:
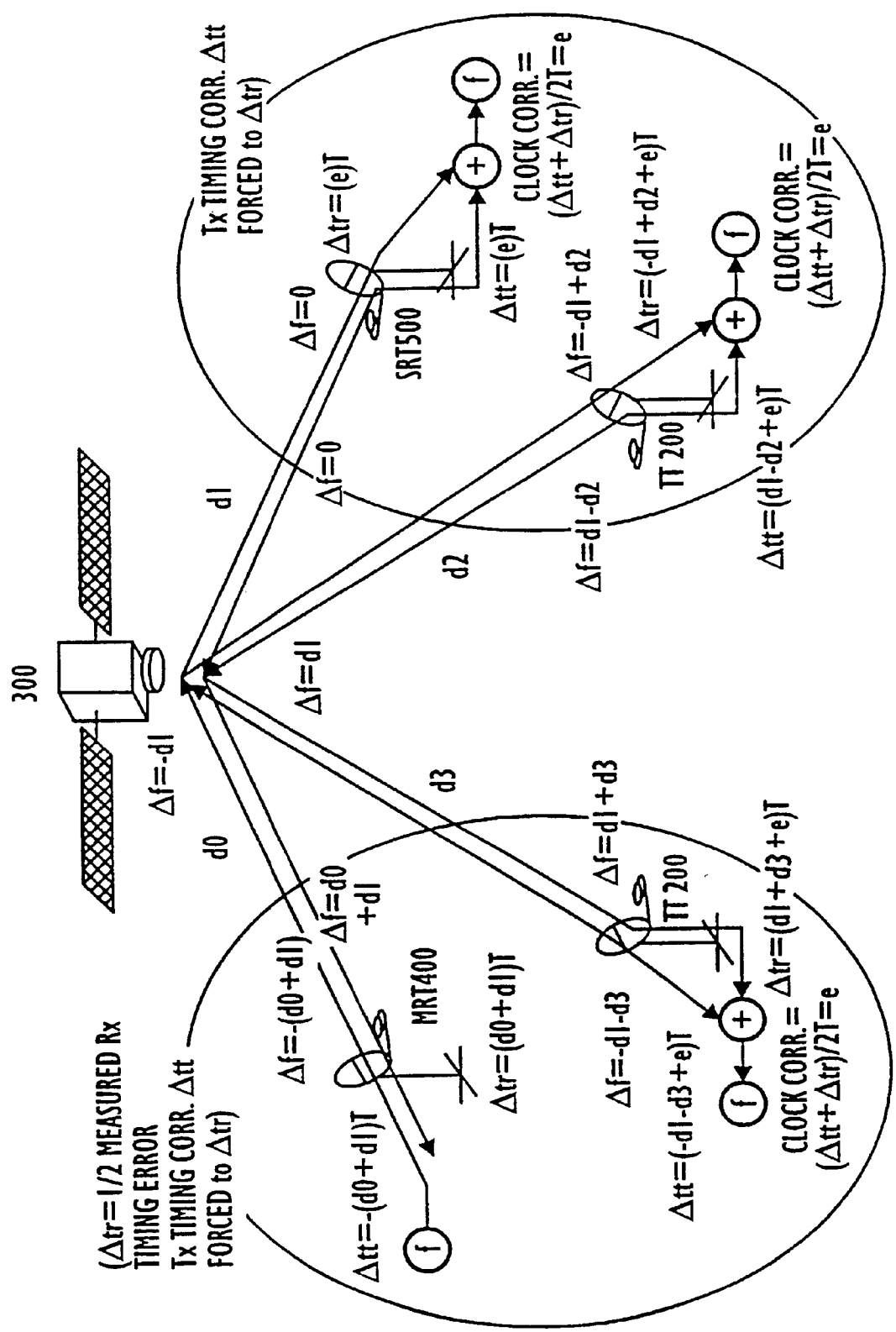
FIG. 3 is a representational diagram of the various clock and offsets associated with spot beam operation of the system illustrated in FIG. 1.

Before beginning a detailed discussion of method for generating a Doppler-free local clock according to the preferred embodiments of the present invention, a brief discussion of the system employing the novel methods according to the present invention will be presented while referring to FIGS. 1 through 3, wherein at least one traffic terminal (TT) 200 is operatively connected to a master reference terminal (MRT) 400 via a satellite 300. The system advantageously can include a secondary reference terminal (SRT) 500, which is depicted in block form in FIG. 1. It should be mentioned that the inventive method is equally advantageous for systems, i.e., a network with global beams or a network with spot beams, wherein the Master Reference Terminal (MRT) can receive its own transmissions. Such a system is depicted in alternative ways in FIGS. 1 and 2.

Referring first to FIG. 1, the system controlled according to a first embodiment of the novel methods of the present invention consists of a MRT 400 connected to at least one terminal (TT) 200 via a satellite 300. As illustrated in FIG. 2, the terminal 200 preferably includes a modulator 204 for generating a signal of frequency f, operatively coupled to a transmitter 202, which is attached to an antenna (FIG. 1). Advantageously, terminal 200 includes a receiver 206 operatively connected to both the antenna of FIG. 1 and a demodulator 208. All of the components 202, 204, 206, and 208 are controlled by a controller 210, which controller is connected to a memory 212 storing various data values, all of which will be discussed in greater detail below. Preferably, the terminal 200 also includes a timing control block 214, the operation on which will be discussed in greater detail below. Several non-limiting, possible configurations of the timing control block are discussed below with respect to FIGS. 5 and 6.

Still referring to FIG. 1, the MRT 400 advantageously can include a modulator 404 for generating a signal at a predetermined frequency, which modulator is operatively coupled to a transmitter 402, which is attached to the antenna of FIG. 1. Advantageously, MRT 400 also includes a receiver 406 operatively connected to both the antenna of FIG. 1 and a demodulator 408. All of the components 402, 404, 406, and 408 are controlled by a controller 410, which controller is connected to a memory 412 storing various data values, all of which will be discussed in greater detail below. Preferably, MRT 400 also includes a timing control block 414, the operation on which will also be discussed in greater detail below.

FIG. 2 illustrates the relationships between the various clocks and offsets in a communication system capable of global beam operation. The following notations are used in FIG. 2:

d0,d1 Uplink Doppler at the MRT 400 and IT 200 e Frequency inaccuracy of the TT local oscillator

Δf Frequency errors at various reference points

T Measurement interval for timing correction

Δtr Amount of receive timing correction

Δtt Amount of transmit timing correction

From FIG. 2, it will be appreciated that the start of receive frame (SORF)/start of transmit frame (SOTF) instants at the satellite 300 do not drift in time due to Doppler (except for short term fluctuations). Moreover, the rate of SORF arrivals at the satellite 300 is a multiple of R, i.e., the reference terminal clock frequency.

In contrast, FIG. 3 illustrates the relationships between the various clocks and offsets for spot beam operation in the communication system. It will be appreciated that the SORF/SOTF instants at the secondary reference terminal (SRT) 500 do not drift in time due to Doppler (except for short term fluctuations). The rate of SORF instants at the SRT 500 is a multiple to R, i.e., the reference terminal clock frequency. The rate of SORF instants at the satellite 300 is a function of R and the Doppler rate.

The circuitry preferably included in the timing control block 414 of MRT 400 will now be described with respect to FIG. 4, in which numeral 4141 indicates a transmit frame counter while numeral 4142 indicates a receive frame counter. Both of the frame counters 4141 and 4142 receive a reference clock R from reference oscillator 4143. Moreover, both of the frame counters advantageously receive transmit and receive correction signals for a timing correction processor 4144, the operation of which will be described in greater below.

The circuitry preferably included in a first preferred embodiment of the timing control block 214 of TT 200 will now be described with respect to FIG. 5, in which numeral 2141 indicates a transmit frame counter while numeral 2142 indicates a receive frame counter. Both of the frame counters 2141 and 2142 receive a reference clock Rf from voltage controlled oscillator (VCXO) 2143. Moreover, both of the frame counters advantageously receive transmit and receive correction signals for a timing correction processor 2144, the operation of which will be described in greater below. It should also be mentioned that a clock correction processor 2145 advantageously is included, which receives inputs from the timing correction processor 2144 and outputs a frequency correction signal to the VCXO 2143. In an exemplary case, the frequency correction signal can one of a numeric value applied to a digital to analog converter (DAC) 2145a or an analog signal capable of controlling the VCXO 2143 directly.

Figure 6:
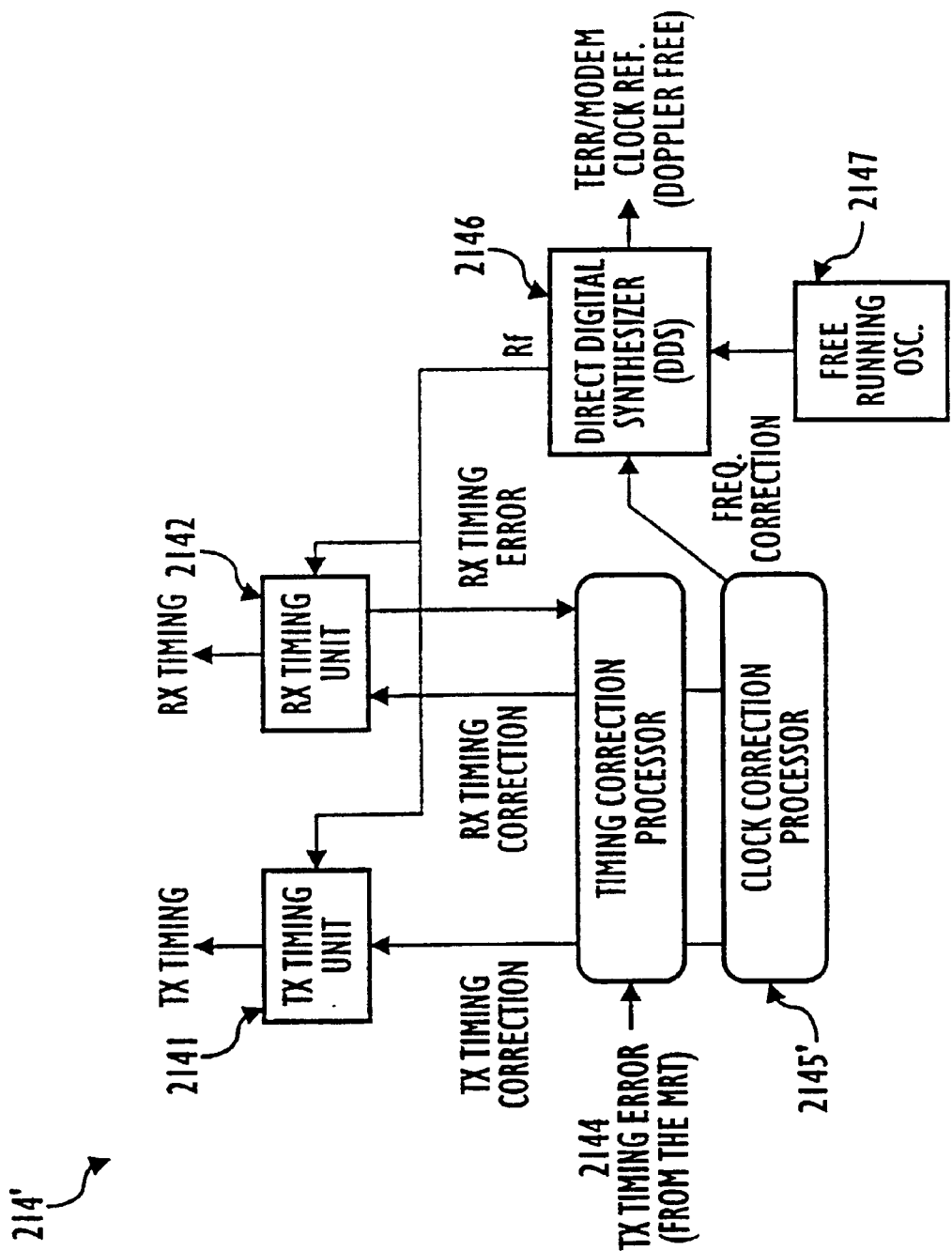
FIG. 6 is a high level block diagram of another preferred embodiment of the timing control block located in the traffic terminal illustrated in FIG. 1.

The circuitry preferably included in a second preferred embodiment of the timing control block 214' of TT 200 is illustrated in FIG. 6, in which numeral 2141 indicates a transmit frame counter while numeral 2142 indicates a receive frame counter. Both of the frame counters 2141 and 2142 receive a reference clock Rf from direct digital synthesizer (DDS) 2146 coupled to a free running oscillator 2147. Moreover, both of the frame counters 2141 and 2142 advantageously receive transmit and receive correction signals for a timing correction processor 2144, the operation of which will be described in greater below. It should also be mentioned that a clock correction processor 2145' advantageously is included, which receives inputs from the timing correction processor 2144 and outputs a frequency correction signal to the DDS 2146.

The method for generating a Doppler-free local clock according to the present invention will now be described while referring to FIGS. 4–6. First the clock control procedure used to initialize clock in the MRT 400 advantageously will be discussed with respect to FIG. 4 and then the alternative procedures for correcting the clock in TT 200 will be described with respect to FIGS. 5 and 6.

Figure 4:
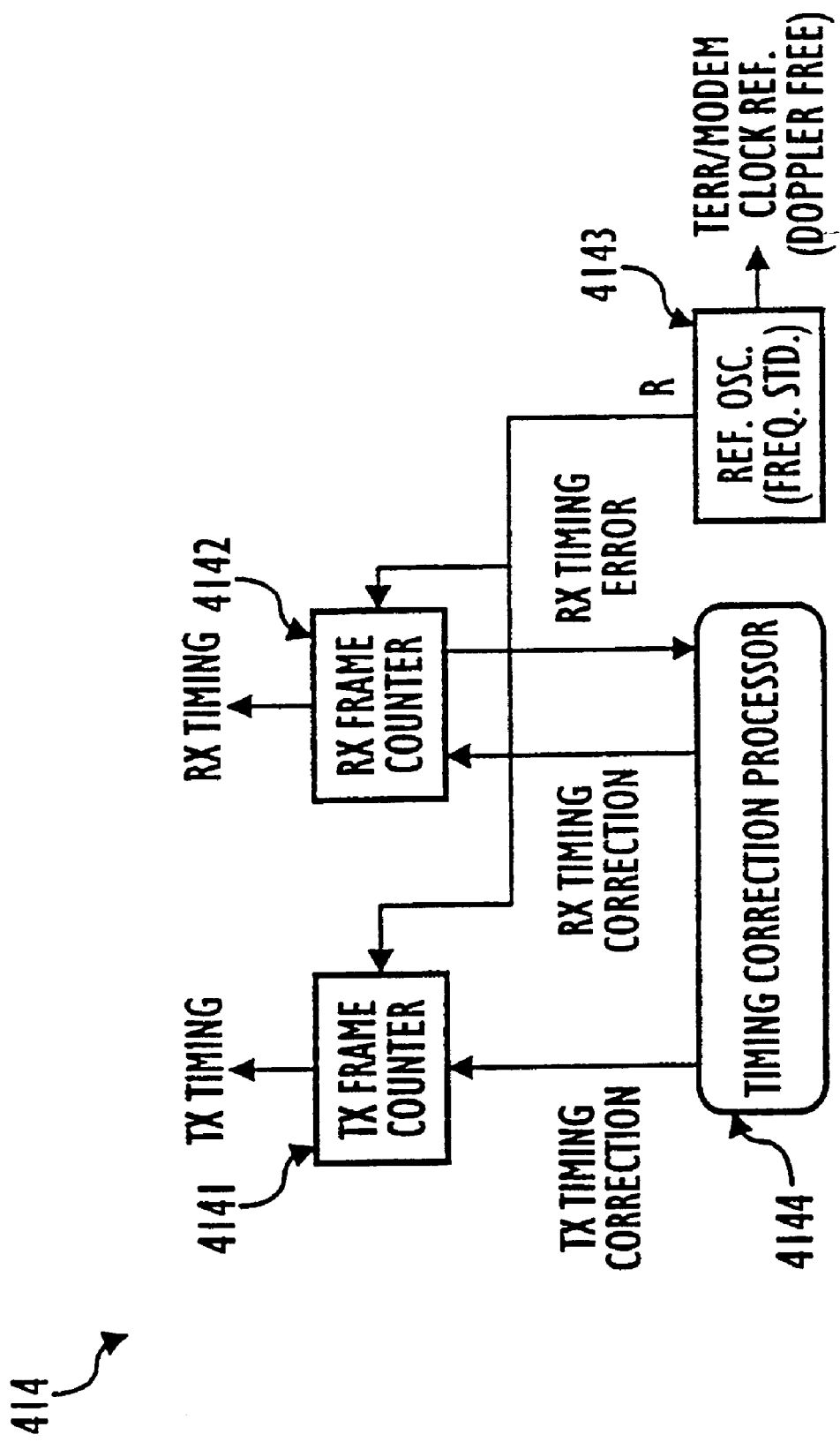
FIG. 4 is a high level block diagram of the timing control block in either the master reference terminal or the secondary reference terminal illustrated in FIG. 1.

Referring now to FIG. 4, after receive synchronization is achieved, the MRT 400 measures the receive timing error rn, which is the offset between the arrival time of a looped back reference burst (RB) and the expected arrival time of the RB, based on the locally generated receive frame time. See FIG. 4. It will be appreciated that the timing error measurement is performed using the clock R under the control of the timing correction processor 4144, which receives the receive timing error signal developed by the frame counter 4142. Subsequently, a check is performed to determine if the absolute value of the receive timing error |rn| is greater than a predetermined threshold, e.g., 4. When |rn| exceeds the threshold, the receive frame counter 4142 is adjusted by rn/2 while the transmit frame counter 4141 is adjusted by −rn/2. When the threshold is not exceeded, the frame counter are not adjusted. After one round trip time, i.e., when the effect of a transmit correction on the transmit frame counter 4141 appears at the receive side of MRT 400, the above procedure is repeated.

Figure 5:
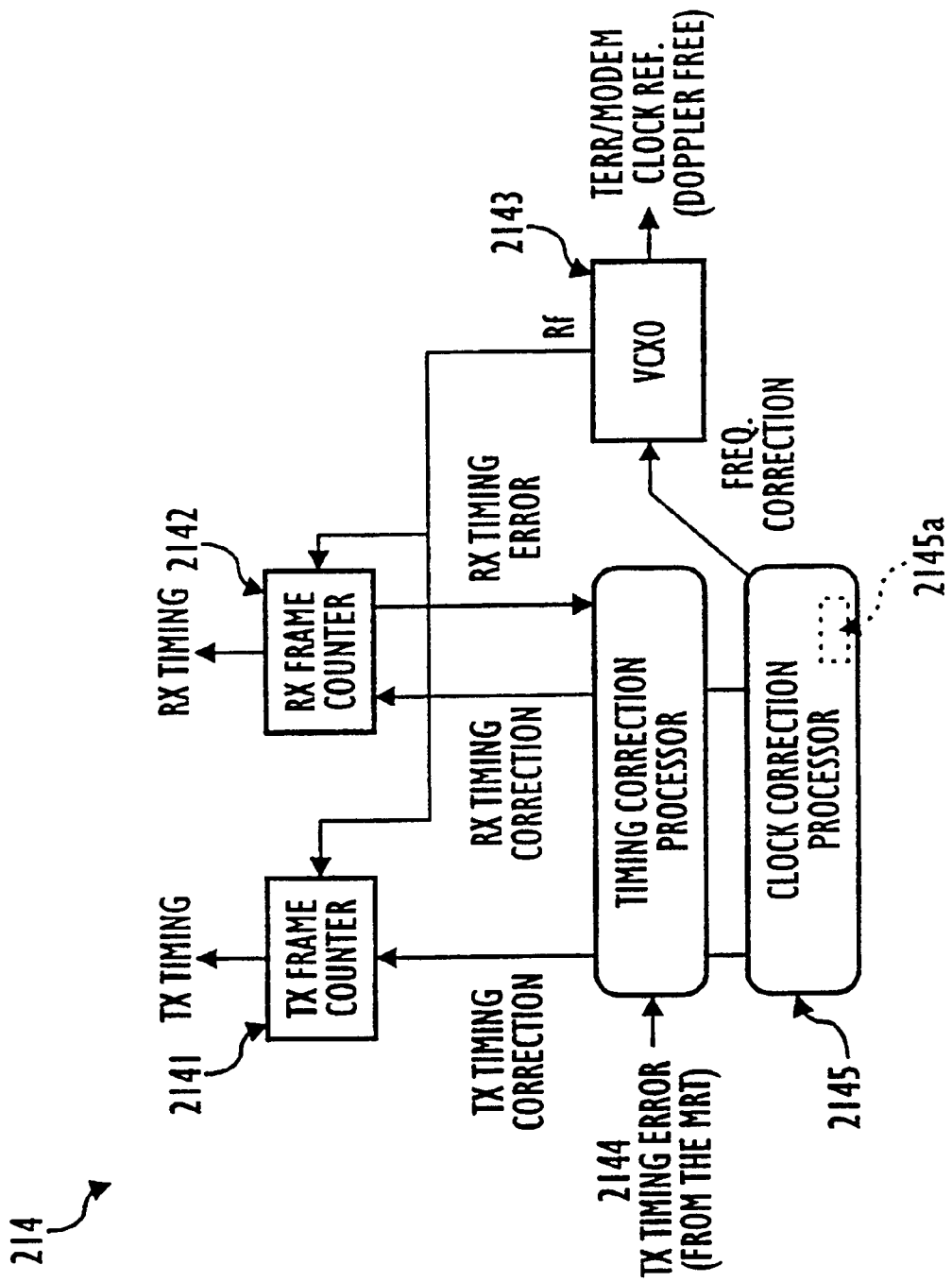
Fig. 5 is a high level block diagram of one preferred embodiment of the timing control block located in the traffic terminal illustrated in FIG. 1.

Referring generally to FIGS. 5 and 6, the clock correction procedure for the Traffic Terminal (TT) 200 will now be described. It will be appreciated from the discussion above that the traffic terminal (TT) 200 may employ either a VCXO 2143 or a DDS with a free running oscillator 2146,2147 to clock the transmit and receive frame counters 2141, 2142. The objective of TT 200 clock control is to reproduce a Doppler-free clock Rf at TT 200. It should be mentioned that the receive timing error is measured at the TT 200 as the offset between the arrival time of a RB and the expected arrival time of the RB, based on the locally generated receive frame time. It should also be mention that the transmit timing error is measured at the MRT 400 as the offset between the arrival time of a TT management or control burst and its nominal arrival time in the MRT 400 receive frame time. The MRT 400 sends the measured timing error to the TT 200 over a signaling channel of the satellite 300. As illustrated in FIGS. 5 and 6, timing corrections are performed by adjusting frame counters 2141 and 2142 and frequency corrections are performed by changing the clock frequency of either VCXO 2143 or DDS 2146. Finally, is must be mentioned that terrestrial interface clocks advantageously are generated by a phase locked loop (PLL) from a Doppler-free local clock.

Figure 7:
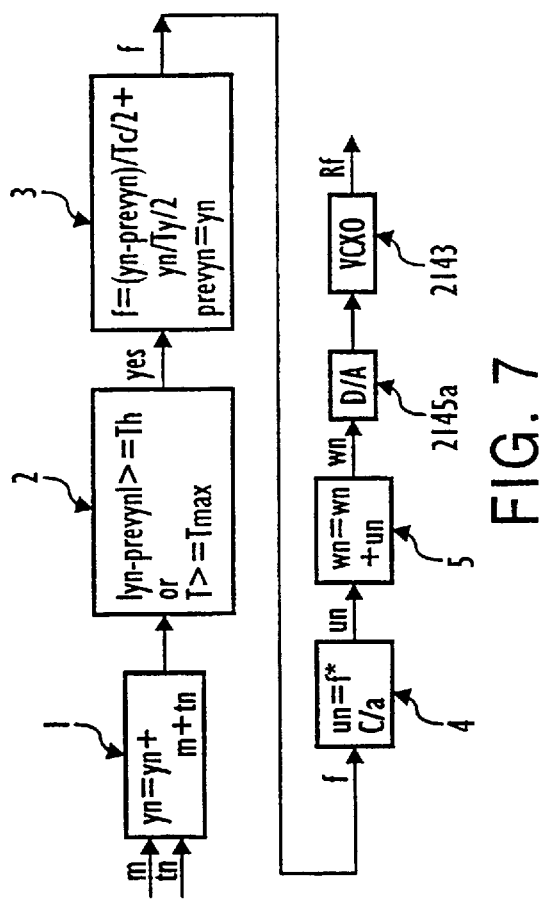
FIG. 7 is a flowchart illustrating the operation of the circuitry illustrated in FIG. 5.
Figure 8:
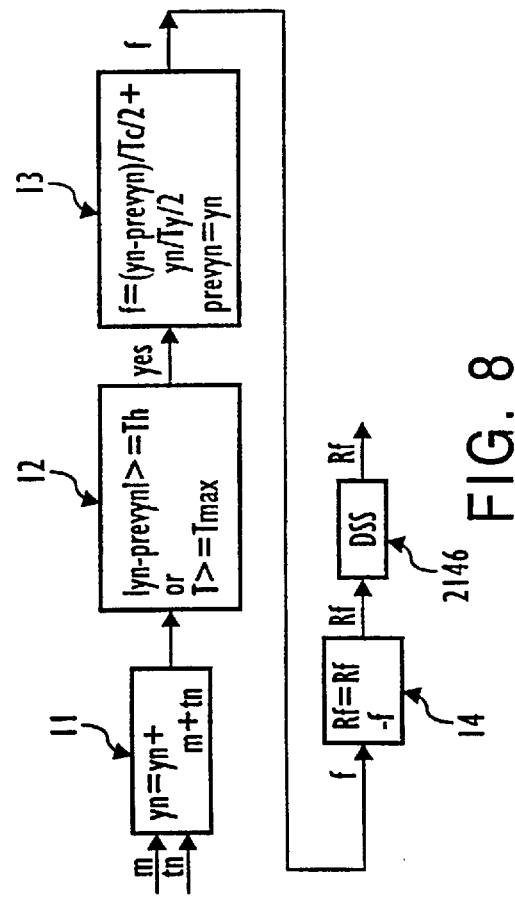
FIG. 8 is a flowchart illustrating the operation of the circuitry illustrated in FIG. 6.

The alternative clock correction procedures for TT 200 are illustrated in FIGS. 7 and 8. Before discussing those procedures in detail, it would facilitate understanding of the procedures to discuss the nomenclature used therein. The various parameters employed in FIGS. 7 and 8 are defined as follows:

rn: amount of correction made to receive frame counter, in bits, at any given receive timing correction event. A positive value implies that the receive timing was adjusted to the "right," implying that the local clock is faster than the received clock. Rn (and tn) measurements are expressed in bits at the Rf clock rate.

tn: amount of correction made to transmit frame counter in bits at any given transmit timing correction event. A positive value implies that the transmit timing was adjusted to the "right," implying that the local clock is faster than the receive clock at the reference terminal.

yn: total accumulated error, since the last receive acquisition was successfully done.

prevyn: value of yn when the previous clock correction was made f: the required change in reference frequency (Rf) in Hz. Rf should be decreased by f. A positive value of f implies that the local clock Rf is faster than R.

T measurement period; in seconds; a multiple of the frame period.

Th: Threshold value used for triggering correction [recommended value 4].

Tmax: Maximum period without triggering correction [recommended value 60–120 seconds].

Ty: See below.

Tc: See below.

un: VXCO correction voltage value.

wn: VXCO total voltage value.

C, a: VCXO parameters; see below.

Referring first to FIGS. 5 and 7, the clock control procedure for the TT 200 equipped with a VCXO 2143 will now be described. As a preliminary matter, it should be mentioned that during receive frame acquisition, wn is set to the value saved in a local database. It should also be mentioned that, in general, whenever wn is changed, its value is saved in the database in non-volatile memory. During terminal installation, wn is set to a nominal value. After receive frame acquisition has been completed, yn is initialized to 0. Receive timing corrections are thereafter accumulated into counter yn. After transmit frame acquisition is complete, transmit timing corrections are also accumulated into counter yn. The accumulation is performed during Step 1.

Approximately every control frame time, i.e., the time between transmit timing corrections, yn is evaluated during Step 2. If |yn−prevyn|>Th or T>=Tmax seconds, then the subsequent procedural step are executed. When the conditions are not satisfied, Steps 1 and 2 are repeated. It should be mentioned that T is the amount of time elapsed in seconds since the pervious execution of Step 4. It will also be appreciated that T is a multiple of the control frame time, which is a fixed system constant. The comparison T>=Tmax should be done by counting the number of frames received, not by looking up some local calendar clock or time.

Before discussing the subsequent procedural steps, it would be helpful, for complete understanding of the method for generating a Doppler-free local clock, to discuss the rational behind the check "|yn−prevyn|>Th." In steady state, in general, rn and tn will periodically increment and decrement due to Doppler by the same amount. However, the actual instants of incrementing and decrementing will be unrelated. Hence, yn will vary over time by +−1. Hence, the system should not make clock corrections if |yn−prevyn|<= 1. A threshold of 4 has been chosen instead of 1, to allow the possibility of a missed tn correction. Note that tn corrections are made once per control frame, based on an exchange of messages between a TT 200 and a RT (400 or 500, while rn corrections are made autonomously by TT 200 on every received frame. Moreover, even if yn does not change, it is possible that yn is not 0; the system should adjust the clock to bring yn to 0, which is the reason for the "T >=Tmax sec" check.

During Step 3, the frequency correction value f is computed be clock correction processor 2145, using the following values and expressions:

$Tc$=time since Step 3 was last executed, if $|yn|<=0$ or $|yn|>=8$ $Ty=12$(seconds)

else $Ty=T$max $f=(yn-prevyn)/Tc/2+yn/Ty/2$ $prevyn=yn$.

It should be mentioned that the factor (yn−prevyn)/Tc/2 is the recently measured clock difference; the frequency is immediately adjusted by this amount. The factor yn/Ty/2 is the frequency change needed to correct yn within the next Ty seconds, where yn is the number of "bits" that have accumulated thus far. Ty preferably is selected based on the value of yn. When yn is relatively small, then a large value of Ty is selected to cause a small, slow change in frequency; when yn is relatively large, then a small value of Ty is selected to cause a high change in frequency. The smallest value of Ty (12) should be several times the control frame period. The largest value of Ty (Tmax) should be 2 to 8 times 1/fmin, where fmin is the smallest change in frequency implemented by the hardware in TT 200.

It should, be noted that during the time when receive synchronization is achieved but transmit synchronization is not, strictly speaking, the value of "f" computed above underestimates the frequency difference by half. Hence, f could be multiplied by 2 during this phase. If it is not, then the method for generating a Doppler-free local clock according to the present invention will still converge to the right value; it will just take a bit longer.

During Steps 4 and 5, the output frequency of VCXO 2143 advantageously can be adjusted using the value f from Step 3 to compute the value wn, which is provided as input to the VCXO 2143. During Step 4, the value un is computed from the expression un =f*C/a and, during Step 5, wn is computed using the expression wn=wn+un. It should be mentioned that C is a constant =216/(VCXO input voltage range), where 16 is the number of input bits of the DAC 2145a connected to VCXO 2143. Furthermore, "a" is the slope of the voltage to frequency curve of the VCXO 2143 in Hz/volt, e.g., −121 Hz/volt. Normally, "a" is a negative number, i.e., a positive voltage causes a reduction in frequency. Since the value un provided to the hardware can only take discrete values (−n, . . . −1,0,1, . . . ), it will be rounded to the nearest integer. It should be mentioned that when the value of "a" used in the above equation does not exactly match the value of a' implemented by the VCXO 2143**, then the amount of correction f' will not be equal to −f. If −2f<f'<0, then the method according to the present invention will iteratively converge to the right value of Rf. This implies that a'/a must be <2.

Referring now to FIGS. 6 and 8, the clock control procedure for the TT 200 equipped with a DDS 2146 will now be described. As a preliminary matter, it should be mentioned that during receive frame acquisition, Rf is set to the value saved in the local database. In general, whenever Rf is changed, its value is saved in the database in non-volatile memory. During terminal installation, Rf is set to a nominal value. After receive frame acquisition has been completed, yn is initialized to 0. Receive timing corrections are thereafter accumulated into counter yn. After transmit frame acquisition is complete, transmit timing corrections are also accumulated into counter yn. The accumulation is performed during Step 11.

Approximately every control frame time, i.e., the time between transmit timing corrections, yn is evaluated during Step 12. If |yn−prevyn|>Th or T>=Tmax seconds, then the subsequent procedural step are executed. When the conditions are not satisfied, Steps 11 and 12 are repeated. It should be mentioned that T is the amount of time elapsed in seconds since the pervious execution of Step 4. It will also be appreciated that T is a multiple of the control frame time, which is a fixed system constant. The comparison T>Tmax should be done by counting the number of frames received, not by looking up some local calendar clock or time.

During Step 13, the frequency correction value f is computed be clock correction processor 2145, using the following values and expressions:

$Tc$=time since Step 13 was last executed, $if\ |yn|<=0\ or\ |yn|>=8$ $Ty$=12(seconds)

else $Ty$=$T$max $f$=$(yn-prevyn)Tc/2+yn/Ty/2$ $prevyn$=$yn$.

It should be mentioned that the factor (yn−prevyn)/Tc/2 is the recently measured clock difference; the frequency is immediately adjusted by this amount. The factor yn/Ty/2 is the frequency change needed to correct yn within the next Ty seconds, where yn is the number of "bits" that have accumulated thus far. Ty preferably is selected based on the value of yn. When yn is relatively small, then a large value of Ty is selected to cause a small, slow change in frequency; when yn is relatively large, then a small value of Ty is selected to cause a high change in frequency. The smallest value of Ty (12) should be several times the control frame period. The largest value of Ty (Tmax) should be 2 to 8 times 1/fmin, where fmin is the smallest change in frequency implemented by the hardware in TT 200.

It should be noted that during the time when receive synchronization is achieved but transmit synchronization is not, strictly speaking, the value of "f" computed above underestimates the frequency difference by half. Hence, f could be multiplied by 2 during this phase. If it is not, then the method for generating a Doppler-free local clock according to the present invention will still converge to the right value; it will just take a bit longer.

During Step 14, the frequency of DDS 2146 advantageously can be adjusted using the expression Rf=Rf−f, where the value of f is simply subtracted from the current value of Rf. It should be noted that since the value Rf given to the hardware of TT 200 can only take on certain discrete values (n*F), it will be rounded to the nearest integer.

It should be mentioned at this point that when the output of the VCXO 2143 or DDS 2145 is not Rf but Rf*x, where x is a positive real number, i.e., Rf is derived from output of the VCXO or DDS using a multiplier or divider at a later stage, then f should be multiplied by x in the above equations.

Figure 9:
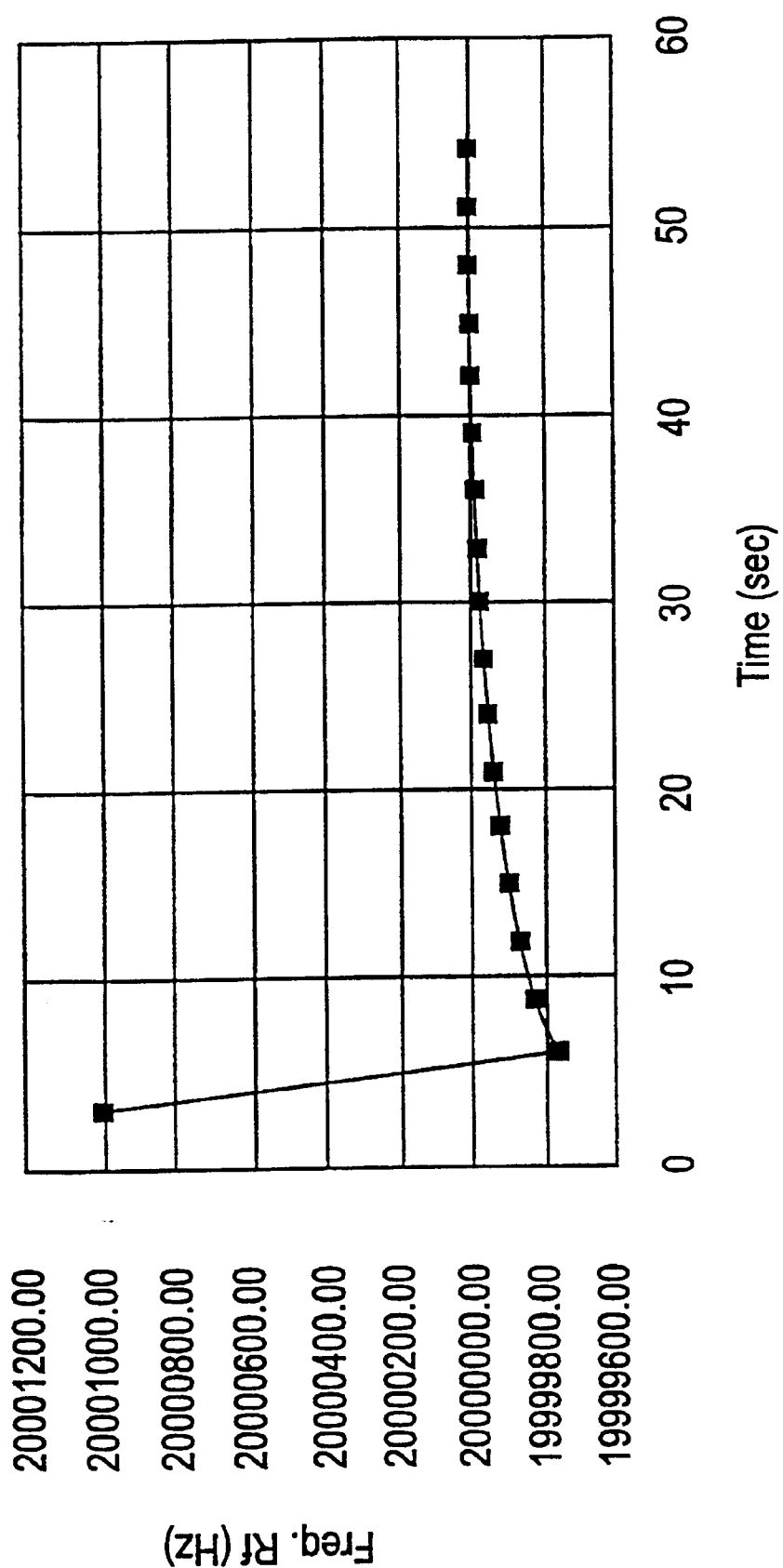
FIGS. 9 and 10 are charts illustrating frequency response and total accumulated error, respectively, for a large impulse to the circuitry illustrated in FIGS. 5 and 6.
Figure 10:
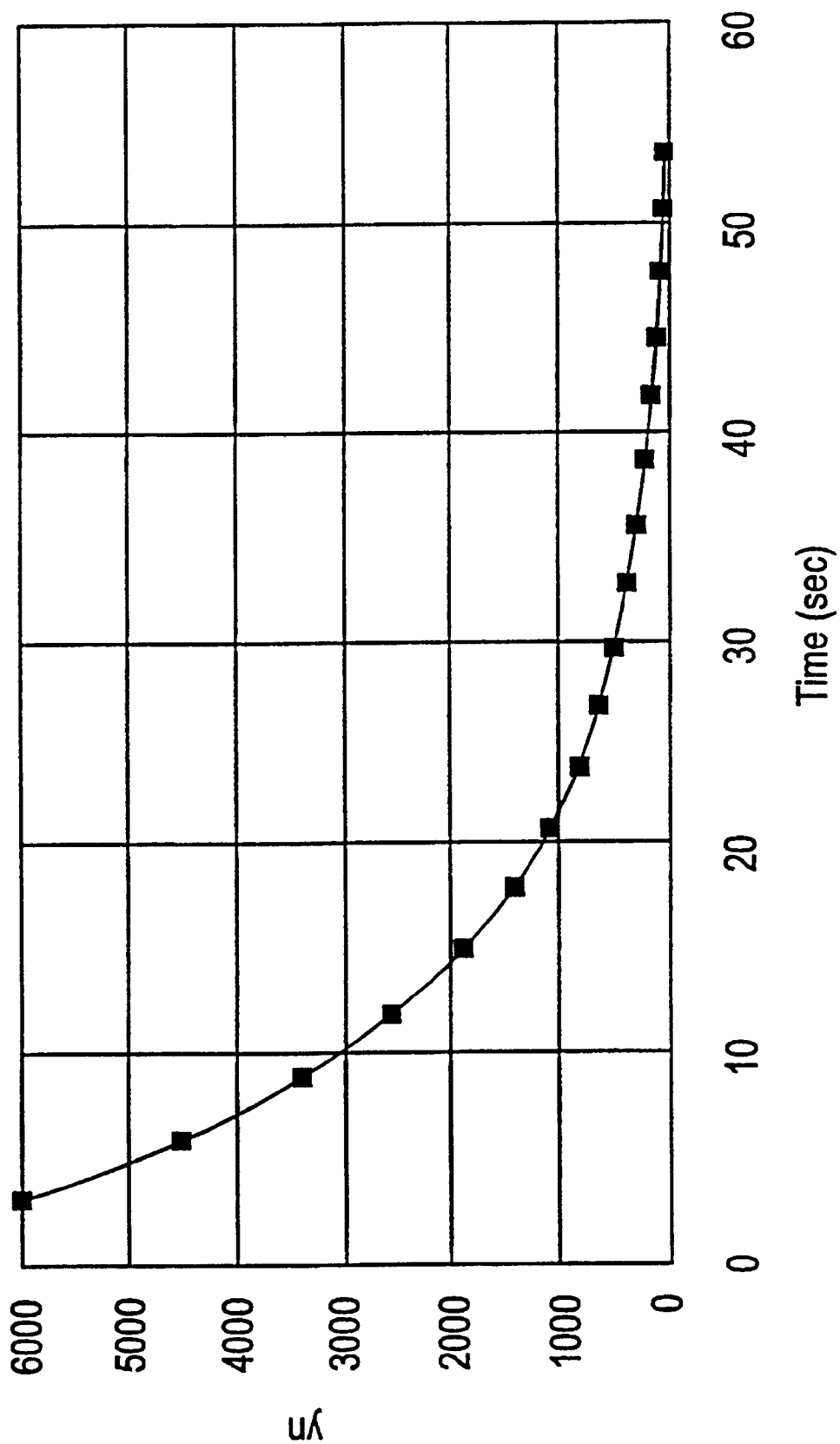
Figure 11:
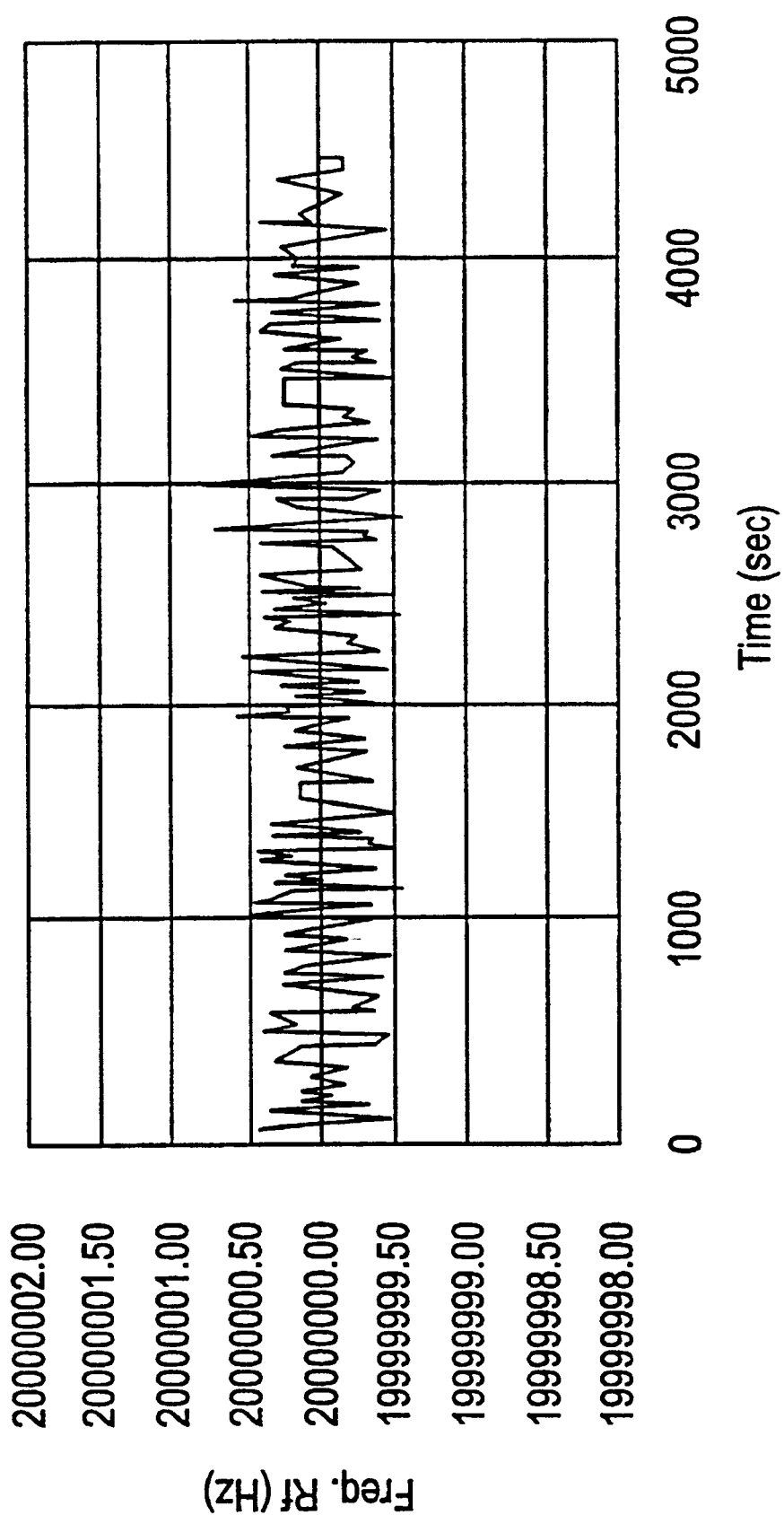
FIGS. 11 and 12 are charts illustrating frequency response and total accumulated error, respectively, for a relatively small random error in the Doppler-free local clock employed in the circuitry illustrated in FIGS. 5 and 6.
Figure 12:
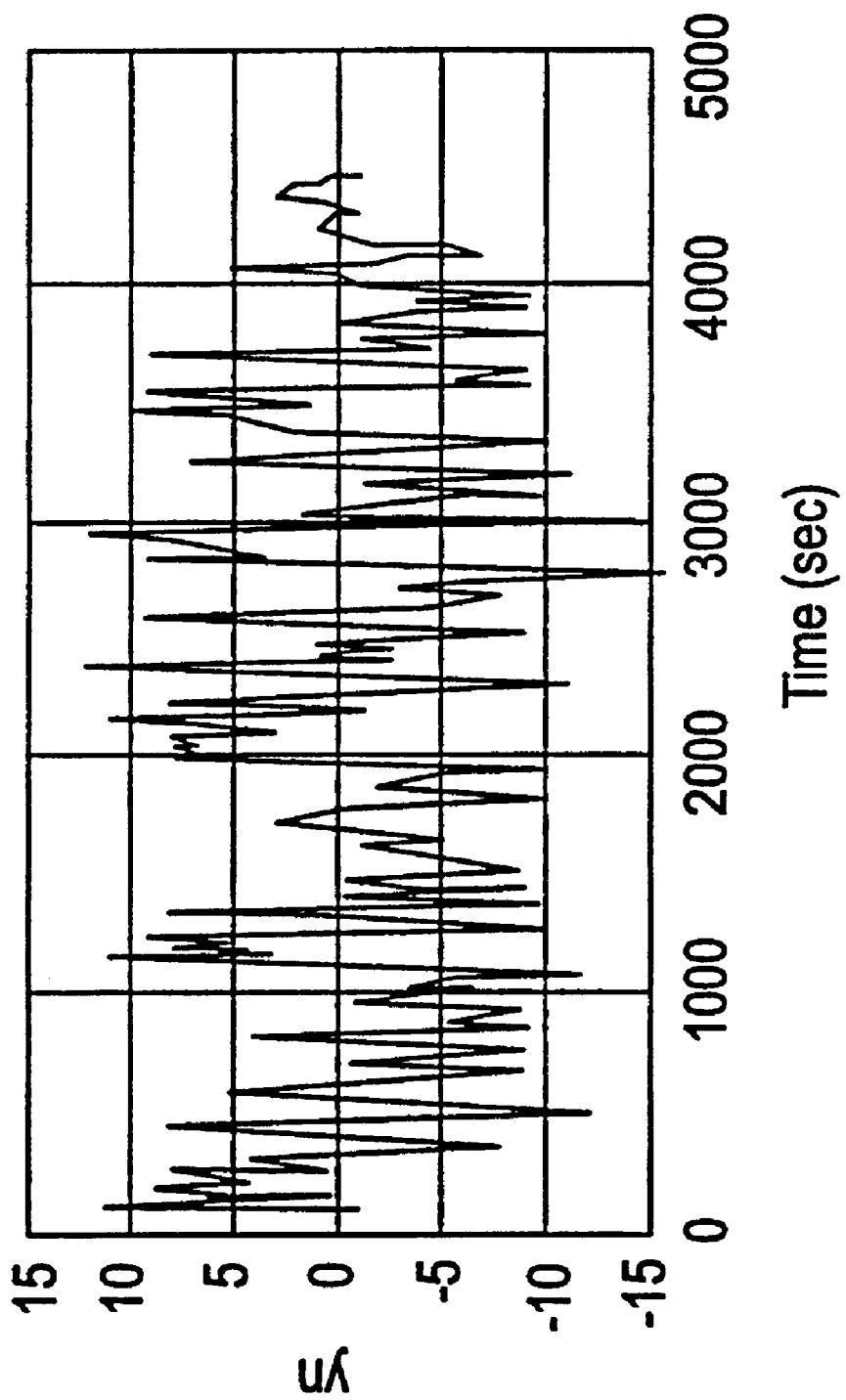

FIGS. 9–12 illustrate the operation of the circuitry in TT 200 in response to system changes. For example, FIG. 9 illustrates the output of the inventive method in response to a relativley large impulse input. In the FIG. 9, T=3 seconds, the initial Rf=20.001 MHZ, R=20 MHZ, Doppler=0. Freq. Change granularity=1/32 Hz. FIG. 10 illustrates the total accumulated error yn for the same scenario. Alternatively, FIGS. 11 and 12 illustrate Rf and yn perturbations when a $10^{-8}$ per second random error is introduced into the clock Rf, using the parameters T=3 seconds, initial Rf =~20 MHZ, R=20 MHZ, Doppler=0, and Freq. Change granularity=1/32 Hz.

It should be mentioned that the method for generating a Doppler-free local clock according to the present invention described above advantageously can also be used for onboard processing/switching satellite systems, such as emerging Ka-band geosynchronous multimedia satellite systems and low earth orbit (LEO) processing satellite systems. In these systems, the method reproduces a Doppler-free clock which is locked to the reference clock on board the satellite.

It should also be noted that the clock generation algorithm described above advantageously can also be used for point-to-point wireless/satellite systems, e.g., in point-to-point wireless/satellite modems. In other words, accurate timing from one modem can be distributed to the other modem using this method. In these latter system ad suitable Time Division Multiplex (TDM) framing structure can be used to implement frame timing measurement and timing correction.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for generating a Doppler-free local clock in a communications network including a master reference terminal and a terminal exchanging reference and management bursts, comprising steps for:

(1) determining a transmit timing correction value responsive to the management burst received by the master reference terminal;

(2) determining a receive timing correction value responsive to the reference burst received by the terminal; and (3) adjusting the frequency of a clock responsive to both said transmit timing correction value and said receive timing correction value to thereby generate the Doppler-free local clock.

2. The method for generating the Doppler-free local clock as recited in claim 1, wherein said step (3) further comprises the steps of:

(3)(i) accumulating said transmit timing correction value and said receive timing correction value to thereby generate a total accumulated error value; and (3)(ii) adjusting the frequency of a clock responsive to said total accumulated error value to thereby generate the Doppler-free local clock.

3. The method for generating the Doppler-free local clock as recited in claim 1, wherein said step (3) further comprises the steps of:

(3)(i) accumulating said transmit timing correction value and said receive timing correction value to thereby generate a total accumulated error value;

(3)(ii) determining when a frequency adjustment is required responsive to said total accumulated error value; and (3)(iii) adjusting the frequency of a clock responsive to said total accumulated error value to thereby generate the Doppler-free local clock.

4. The method for generating the Doppler-free local clock as recited in claim 1, wherein said step (3) further comprises the steps of:
- (3)(i) accumulating said transmit timing correction value and said receive timing correction value to thereby generate a total accumulated error value;
- (3)(ii) determining when a frequency adjustment is required by comparing said total accumulated error value to a previously stored total accumulated error value; and
- (3)(iii) adjusting the frequency of a clock responsive to said total accumulated error value to thereby generate the Doppler-free local clock.

5. The method for generating the Doppler-free local clock as recited in claim 1, wherein said step (3) further comprises the steps of:
- (3)(i) accumulating said transmit timing correction value and said receive timing correction value to thereby generate a total accumulated error value;
- (3)(ii) determining when a frequency adjustment is required by comparing the number of frames received by the terminal with a predetermined maximum value; and
- (3)(iii) adjusting the frequency of a clock responsive to said total accumulated error value to thereby generate the Doppler-free local clock.

6. The method for generating the Doppler-free local clock as recited in claim 1, wherein said step (3) further comprises the steps of:
- (3)(i) accumulating said transmit timing correction value and said receive timing correction value to thereby generate a total accumulated error value;
- (3)(ii) determining when a frequency adjustment is required by comparing said total accumulated error value to a previously stored total accumulated error value; and
- (3)(iii) adjusting the frequency of a clock responsive to said total accumulated error value to thereby generate the Doppler-free local clock using the formula:

$$f=(yn-prevyn)/Tc/2+yn/Ty/2$$

where:
- yn is the total accumulated error, since the last receive acquisition was successfully performed,
- prevyn is the value of yn when the previous clock correction was made,
- f is the required change in reference frequency (Rf) in Hz,
- Ty, is a constant, and
- Tc is the time since f was last computed.

7. The method for generating the Doppler-free local clock as recited in claim 1, wherein said step (3) further comprises the steps of:
- (3)(i) accumulating said transmit timing correction value and said receive timing correction value to thereby generate a total accumulated error value;
- (3)(ii) determining when a frequency adjustment is required by comparing the number of frames received by the terminal with a predetermined maximum value; and
- (3)(iii) adjusting the frequency of a clock responsive to said total accumulated error value to thereby generate the Doppler-free local clock using the formula:

$$f=(yn-prevyn)/Tc/2+yn/Ty/2$$

where:
- yn is the total accumulated error, since the last receive acquisition was successfully performed,
- prevyn is the value of yn when the previous clock correction was made,
- f is the required change in reference frequency (Rf) in Hz,
- Ty is a constant, and
- Tc is the time since f was last computed.

8. A method for generating a Doppler-free local clock in a communications network including a master reference terminal and a terminal exchanging reference and management bursts, comprising steps for:
- (1) initializing the master reference terminal responsive to a first reference burst generated by the master reference terminal;
- (2) determining a transmit timing correction value responsive to the management burst received by the master reference terminal;
- (3) determining a receive timing correction value responsive to a second reference burst received by the terminal; and
- (4) adjusting the frequency of a clock responsive to both said transmit timing-correction value and said receive timing correction value to thereby generate the Doppler-free local clock.

9. The method for generating the Doppler-free local clock as recited in claim 8, wherein said step (4) further comprises the steps of:
- (4)(i) accumulating said transmit timing correction value and said receive timing correction value to thereby generate a total accumulated error value; and
- (4)(ii) adjusting the frequency of a clock responsive to said total accumulated error value to thereby generate the Doppler-free local clock.

10. The method for generating the Doppler-free local clock as recited in claim 8, wherein said step (4) further comprises the steps of:
- (4)(i) accumulating said transmit timing correction value and said receive timing correction value to thereby generate a total accumulated error value;
- (4)(ii) determining when a frequency adjustment is required responsive to said total accumulated error value; and
- (4)(iii) adjusting the frequency of a clock responsive to said total accumulated error value to thereby generate the Doppler-free local clock.

11. The method for generating the Doppler-free local clock as recited in claim 8, wherein said step (4) further comprises the steps of:
- (4)(i) accumulating said transmit timing correction value and said receive timing correction value to thereby generate a total accumulated error value;
- (4)(ii) determining when a frequency adjustment is required responsive to said total accumulated error value;
- (4)(iii) when the frequency adjustment is not required, repeating said steps (2) and (3); and
- (4)(iv) when the frequency adjustment is required, adjusting the frequency of a clock responsive to said total accumulated error value to thereby generate the Doppler-free local clock.

12. The method for generating the Doppler-free local clock as recited in claim 8, wherein said step (4) further comprises the steps of:

(4)(i) accumulating said transmit timing correction value and said receive timing correction value to thereby generate a total accumulated error value;

(4)(ii) determining when a frequency adjustment is required by comparing said total accumulated error value to a previously stored total accumulated error value; and (4)(iii) adjusting the frequency of a clock responsive to said total accumulated error value to thereby generate the Doppler-free local clock.

13. The method for generating the Doppler-free local clock as recited in claim 8, wherein said step (4) further comprises the steps of:

(4)(i) accumulating said transmit timing correction value and said receive timing correction value to thereby generate a total accumulated error value;

(4)(ii) determining when a frequency adjustment is required by comparing the number of frames received by the terminal with a predetermined maximum value; and (4)(iii) adjusting the frequency of a clock responsive to said total accumulated error value to thereby generate the Doppler-free local clock.

14. The method for generating the Doppler-free local clock as recited in claim 8, wherein said step (4) further comprises the steps of:

(4)(i) accumulating said transmit timing correction value and said receive timing correction value to thereby generate a total accumulated error value;

(4)(ii) determining when a frequency adjustment is required by comparing said total accumulated error value to a previously stored total accumulated error value; and (4)(iii) adjusting the frequency of a clock responsive to said total accumulated error value to thereby generate the Doppler-free local clock using the formula:

$$f=(yn-prevyn)/Tc/2+yn/Ty/2$$

where:

yn is the total accumulated error, since the last receive acquisition was successfully performed, prevyn is the value of yn when the previous clock correction was made, f is the required change in reference frequency (Rf) in Hz, Ty is a constant, and Tc is the time since f was last computed.

15. The method for generating the Doppler-free local clock as recited in claim 8, wherein said step (4) further comprises the steps of:

(4)(i) accumulating said transmit timing correction value and said receive timing correction value to thereby generate a total accumulated error value;

(4)(ii) determining when a frequency adjustment is required by comparing the number of frames received by the terminal with a predetermined maximum value; and (4)(iii) adjusting the frequency of a clock responsive to said total accumulated error value to thereby generate the Doppler-free local clock using the formula:

$$f=(yn-prevyn)/Tc/2+yn/Ty/2$$

where:

yn is the total accumulated error, since the last receive acquisition was successfully performed, prevyn is the value of yn when the previous clock correction was made, f is the required change in reference frequency (Rf) in Hz, Ty is a constant, and Tc is the time since f was last computed.

16. A method for generating a Doppler-free local clock in a communications network including a master reference terminal and a terminal exchanging reference and management bursts, comprising steps for:

(1) initializing the master reference terminal responsive to a first reference burst generated by the master reference terminal;

(2) determining a transmit timing correction value responsive to the management burst received by the master reference terminal;

(3) determining a receive timing correction value responsive to a second reference burst received by the terminal; and (4) accumulating said transmit timing correction value and said receive timing correction value to thereby generate a total accumulated error value;

(5) determining whether a frequency adjustment is required responsive to said total accumulated error value;

(6) when the frequency adjustment is not required, repeating said steps (2) and (3);

(7) when the frequency adjustment is required, calculating an adjustment value which is applied to the frequency of a clock responsive to said total accumulated error value to thereby generate the Doppler-free local clock using the formula:

$$f(yn-prevyn)/Tc/2+yn/Ty/2$$

where:

yn is the total accumulated error, since the last receive acquisition was successfully performed, prevyn is the value of yn when the previous clock correction was made, f is the adjustment value indicative of the required change in reference frequency (Rf) in Hz, Ty is a constant, and Tc is the time since f was last computed.

17. The method for generating the Doppler-free local clock as recited in claim 16, wherein the terminal includes a direct digital synthesizer (DDS) operatively coupled to a free running oscillator, and wherein said method further comprises the step of:

(8) applying said adjustment value to said DDS.

18. The method for generating the Doppler-free local clock as recited in claim 16, wherein the terminal includes a voltage controlled oscillator (VCXO), and wherein said method further comprises the step of:

(8) calculating a corrected voltage value responsive to said adjustment value;

(9) calculating an applied voltage value responsive to said corrected voltage value and a previously applied VCXO voltage; and

(10) applying said applied value to said VCXO.

* * * * *